(12) United States Patent
Parks

(10) Patent No.: US 8,516,001 B2
(45) Date of Patent: Aug. 20, 2013

(54) CONTEXT PLATFORM

(75) Inventor: Gregory Parks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 852 days.

(21) Appl. No.: 12/144,640

(22) Filed: Jun. 24, 2008

(65) Prior Publication Data
US 2009/0319569 A1 Dec. 24, 2009

(51) Int. Cl.
*G06F 7/00* (2006.01)
*G06F 17/30* (2006.01)

(52) U.S. Cl.
USPC ............................. 707/793; 707/792

(58) Field of Classification Search
CPC .......................... G06F 17/30286; G06Q 10/10
USPC ................. 707/791, 792, 795, 796, 802, 793
See application file for complete search history.

(56) References Cited

U.S. PATENT DOCUMENTS

| | | | |
|---|---|---|---|
| 5,418,888 A * | 5/1995 | Alden ............................. | 706/48 |
| 5,737,557 A | 4/1998 | Sullivan | |
| 5,764,928 A | 6/1998 | Lanctot | |
| 5,778,150 A | 7/1998 | Chan et al. | |
| 6,013,108 A | 1/2000 | Karolys et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,697,879 B1 | 2/2004 | Tufty et al. | |
| 6,747,675 B1 | 6/2004 | Abbott et al. | |
| 6,771,208 B2 | 8/2004 | Lutter et al. | |
| 6,791,580 B1 | 9/2004 | Abbott et al. | |
| 6,801,223 B1 | 10/2004 | Abbott et al. | |
| 6,810,363 B2 | 10/2004 | Newman et al. | |
| 6,812,937 B1 | 11/2004 | Abbott et al. | |
| 6,842,877 B2 | 1/2005 | Robarts et al. | |
| 6,874,127 B2 | 3/2005 | Newell et al. | |
| 6,889,282 B2 | 5/2005 | Schollenberger | |
| 6,920,616 B1 * | 7/2005 | Abbott et al. .................. | 715/744 |
| 6,968,333 B2 | 11/2005 | Abbott et al. | |
| 7,046,263 B1 | 5/2006 | Abbott et al. | |
| 7,055,101 B2 | 5/2006 | Abbott et al. | |
| 7,058,893 B2 | 6/2006 | Abbott et al. | |
| 7,058,894 B2 | 6/2006 | Abbott et al. | |
| 7,062,715 B2 | 6/2006 | Abbott et al. | |

(Continued)

FOREIGN PATENT DOCUMENTS

WO WO 2008051929 A2 * 5/2008
WO WO 2008077628 A2 * 7/2008

OTHER PUBLICATIONS

King et al., "Atlas: A Service-Oriented Sensor Platform", Proceedings 2006 31st IEEE Conference on Local Computer Networks, Nov. 2008, 8 pages.

(Continued)

*Primary Examiner* — Robert Beausoliel, Jr.
*Assistant Examiner* — Hexing Liu
(74) *Attorney, Agent, or Firm* — Alleman Hall McCoy Russell & Tuttle LLP

(57) ABSTRACT

A context store holding one or more context items is accessible by one or more domain interpreters. Each context item includes a unique identifier and one or more context-describing values. The domain interpreters include context providers for loading a context item with context-describing values and/or context consumers for taking context-describing values from a context item.

19 Claims, 3 Drawing Sheets

(56) References Cited

U.S. PATENT DOCUMENTS

| | | | |
|---|---|---|---|
| 7,073,129 B1 | 7/2006 | Robarts et al. | |
| 7,076,737 B2 | 7/2006 | Abbott et al. | |
| 7,080,322 B2 | 7/2006 | Abbott et al. | |
| 7,089,497 B2 | 8/2006 | Abbott et al. | |
| 7,107,539 B2 | 9/2006 | Abbott et al. | |
| 7,134,994 B2 | 11/2006 | Alpert et al. | |
| 7,137,069 B2 | 11/2006 | Abbott et al. | |
| 7,149,660 B2 | 12/2006 | Kuehn et al. | |
| 7,155,456 B2 | 12/2006 | Abbott, II et al. | |
| 7,203,906 B2 | 4/2007 | Abbott et al. | |
| 7,225,229 B1 | 5/2007 | Abbott et al. | |
| 7,231,439 B1 | 6/2007 | Abbott et al. | |
| 7,233,830 B1 | 6/2007 | Callaghan et al. | |
| 7,296,042 B2 | 11/2007 | Edwards et al. | |
| 7,315,791 B2 | 1/2008 | Ilic et al. | |
| 7,346,663 B2 | 3/2008 | Abbott et al. | |
| 7,356,580 B1 | 4/2008 | Huang et al. | |
| 7,395,507 B2 | 7/2008 | Robarts et al. | |
| 7,444,594 B2 | 10/2008 | Abbott et al. | |
| 7,464,153 B1 | 12/2008 | Abbott et al. | |
| 7,478,331 B2 | 1/2009 | Abbott et al. | |
| 7,496,849 B2 | 2/2009 | Abbott et al. | |
| 7,512,889 B2 | 3/2009 | Newell et al. | |
| 7,533,082 B2 | 5/2009 | Abbott et al. | |
| 7,614,001 B2 | 11/2009 | Abbott et al. | |
| 7,647,400 B2 | 1/2010 | Abbott et al. | |
| 7,689,919 B2 | 3/2010 | Abbott et al. | |
| 7,725,628 B1 | 5/2010 | Phan et al. | |
| 7,730,198 B2 | 6/2010 | Ruppert et al. | |
| 7,734,780 B2 | 6/2010 | Abbott et al. | |
| 7,739,607 B2 | 6/2010 | Abbott et al. | |
| 7,769,767 B2 * | 8/2010 | Petersen | 707/754 |
| 7,779,015 B2 | 8/2010 | Abbott et al. | |
| 7,827,281 B2 | 11/2010 | Abbott et al. | |
| 7,856,661 B1 | 12/2010 | Sebes et al. | |
| 7,877,686 B2 | 1/2011 | Abbott et al. | |
| 8,020,104 B2 | 9/2011 | Robarts et al. | |
| 2002/0073340 A1 | 6/2002 | Mambakkam et al. | |
| 2002/0078382 A1 | 6/2002 | Sheikh et al. | |
| 2002/0099817 A1 | 7/2002 | Abbott et al. | |
| 2003/0046401 A1 | 3/2003 | Abbott et al. | |
| 2004/0078219 A1 | 4/2004 | Kaylor et al. | |
| 2004/0266480 A1 | 12/2004 | Hjelt et al. | |
| 2005/0021483 A1 | 1/2005 | Kaplan et al. | |
| 2005/0084082 A1 * | 4/2005 | Horvitz et al. | 379/114.06 |
| 2005/0240943 A1 * | 10/2005 | Smith et al. | 719/328 |
| 2006/0004680 A1 | 1/2006 | Robarts et al. | |
| 2006/0247983 A1 | 11/2006 | Dalli | |
| 2006/0279772 A1 * | 12/2006 | Ludwig et al. | 358/1.15 |
| 2006/0282498 A1 | 12/2006 | Muro | |
| 2007/0043459 A1 | 2/2007 | Abbott, III et al. | |
| 2007/0078527 A1 | 4/2007 | Gonzalez-Banos et al. | |
| 2007/0162957 A1 | 7/2007 | Bartels | |
| 2007/0236346 A1 | 10/2007 | Helal et al. | |
| 2007/0266318 A1 | 11/2007 | Abbott et al. | |
| 2007/0268200 A1 * | 11/2007 | Fuller et al. | 345/1.1 |
| 2008/0005287 A1 | 1/2008 | Harvey et al. | |
| 2008/0065608 A1 | 3/2008 | Liesche et al. | |
| 2008/0224866 A1 | 9/2008 | Rehman | |
| 2009/0006522 A1 | 1/2009 | Kim et al. | |
| 2009/0083768 A1 * | 3/2009 | Hatalkar et al. | 719/328 |
| 2009/0236346 A1 | 9/2009 | Hofeldt et al. | |

OTHER PUBLICATIONS

Siewiorek, D. et al., "SenSay: A Context-Aware Mobile Phone", Proceedings of the 7th IEEE International Symposium on Wearable Computers, Oct. 2003, 2 pages.

Ramamurthy, H. et al., "Wireless Industrial Monitoring and Control using a Smart Sensor Platform", Sensors Journal, IEEE, vol. 7, Issue 5, pp. 611-618, May 2007, 9 pages.

McCarthy, J. et al., "An Integrated GIS-Expert System Framework for Live Hazard Monitoring and Detection", Sensors 2008, vol. 8, pp. 830-846, Feb. 8, 2008, 17 pages.

Gopalan, G. "Building a Smart Sensor using Windows CE", Proceedings of Earth Science Technology Conference. Jun. 2002, 7 pages.

Huang, W. et al., "Contextual Knowledge Representation, Retrieval and Interpretation in Multimedia e-Learning", IEEE International Conference on Information Reuse and Integration, Oct. 2003, 8 pages.

Lieberman, H et al., "Out of Context: Computer Systems that Adapt to, and learn from, context" IBM Systems Journal, vol. 39, Issues 3 and 4, pp. 617-632, 2000, Accessed Apr. 22, 2008, 13 pages.

* cited by examiner

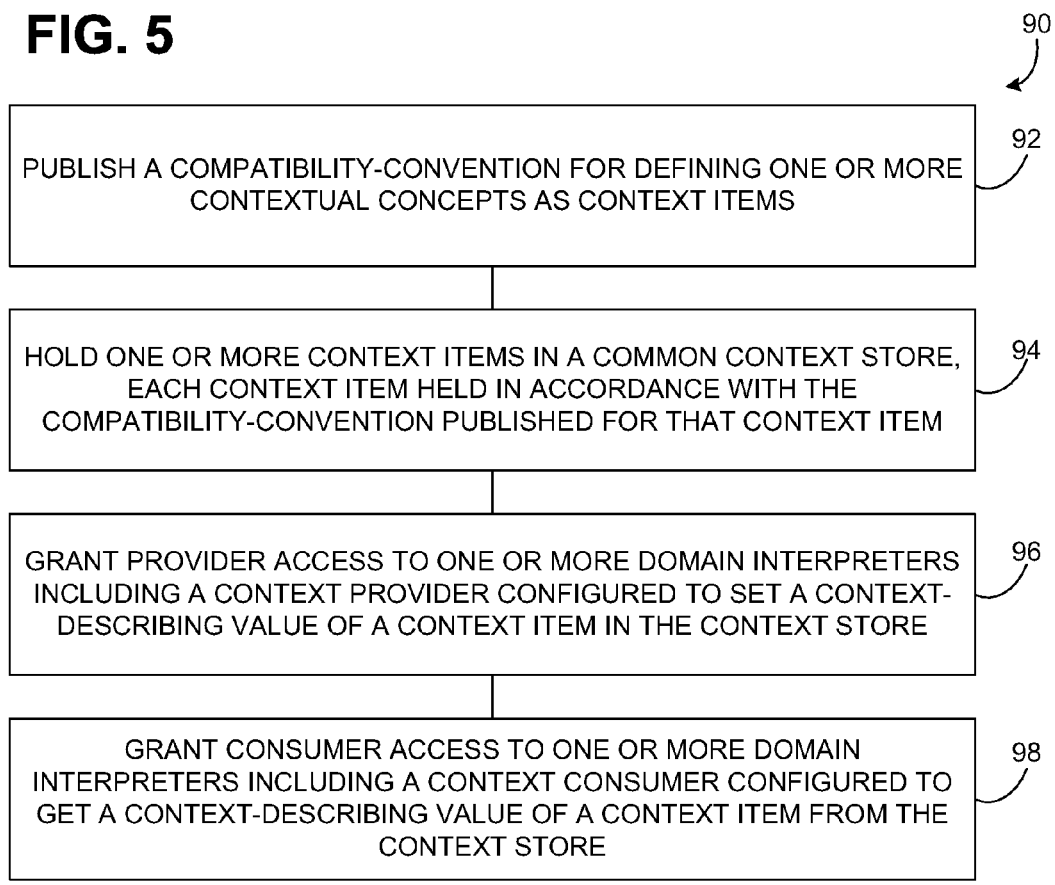

CONTEXT PLATFORM

BACKGROUND

Personal computers are frequently used to access digital information or to assist users in creating such digital information. For example, personal computers can be used to create and access word processing documents, spreadsheets, presentations, digital media, and other forms of digital information. Some computing systems are configured to use one or more sensors to measure aspects of the physical world. However, personal computers have not yet been configured to allow application developers to take full advantage of information from such sensors in an extensible and easy to use manner.

SUMMARY

A context store holding one or more context items is accessible by one or more domain interpreters. Each context item includes a unique identifier and one or more context-describing values. The domain interpreters include context providers for loading a context item with context-describing values and/or context consumers for taking context-describing values from a context item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a process flow of a method of providing a plurality of domain interpreters universal access to a common context store.

DETAILED DESCRIPTION

Figure 1:
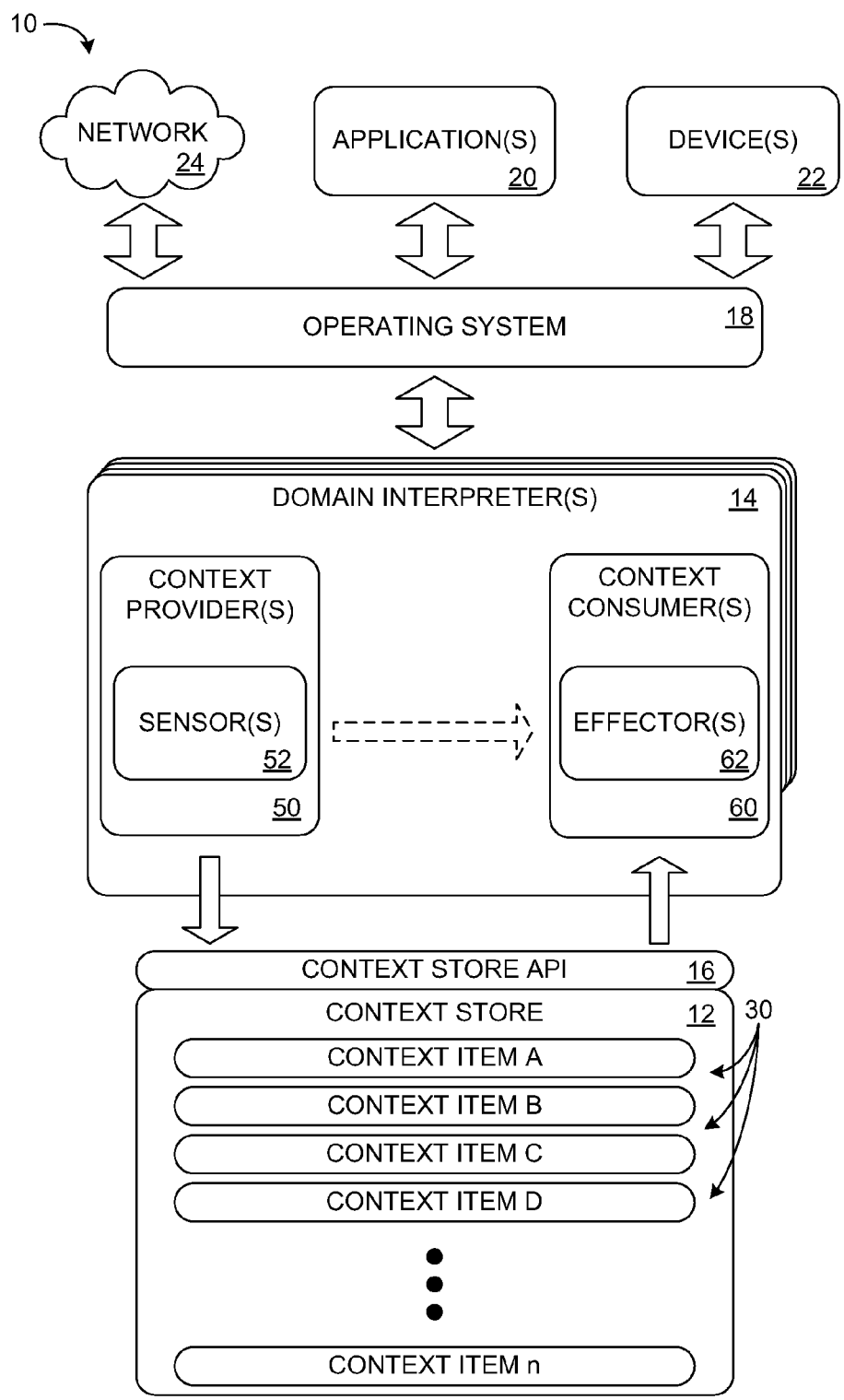
FIG. 1 shows an example computing system for implementing a context platform in accordance with an embodiment of the present disclosure.

FIG. 1 schematically shows a computing system 10 that includes, among other elements, a context store 12, one or more domain interpreters 14, a context store API 16 (application programming interface), an operating system 18, one or more applications 20, and one or more devices 22. The computing system may communicate with other computing systems, devices, sensors, effectors, and the like via a network 24, such as the Internet, an intranet, or another suitable network.

In some embodiments, computing system 10 may include a personal computer, such as a desktop, laptop, or tablet personal computer, although other devices are within the scope of this disclosure. It should be understood that in some embodiments, operating system 18 may include one or more modules for providing at least some of the functionality provided by the herein described context store, context store API, and domain interpreters. In other embodiments, such functionality may be provided by modules designed to cooperate with an operating system (e.g., plug-ins to the operating system or third party applications).

It is to be understood that computing system 10 is illustrated and described in accordance with its application of serving as a context platform. The computing system may include additional and/or alternative components and/or software for providing other functionality. However, to avoid obfuscating the computing system's function as a context platform, the present disclosure does not include description of such components and software.

In the world of personal computing, a hierarchy of increasingly valuable functionality exists, starting from simple access and assistance, advancing to more compelling scenarios that include domain-specific and general advice, and further advancing to include sensory, cognitive, and social augmentation. Augmentation is the ability of a computing system to act intelligently as an agent on behalf of the user but under the supervision of the user. At the highest end of the spectrum is autonomy, the ability for a computing system to know what to do and take unsupervised action without prompting.

Access and assistance are relatively simple to achieve because the computing system need not know much about the environment. An increased level of contextual knowledge is needed in order for a computing system to provide advice, augmentation, or agency functionality. The herein disclosed context platform of computing system 10 provides an extensible framework which developers can utilize to improve access to and use of contextual knowledge, so as to more easily equip the computing system for providing adaption, advice, augmentation, or agency functionality.

Context is a complex concept and comes in many forms with a wide variation across a spectrum of complexity. For example, physical context can be derived from devices, location, senses, and other physical conditions or stimuli. Some physical context is relatively easy to assess (e.g., brightness of light falling on a light sensor or physical location measured by GPS). Other physical context is more difficult to assess (e.g., the concept of "darkness" is complex, it is not composed of simple sense data, but rather a combination of information, including the time of day, the season, transitory phenomena like cloudiness, and information about what a particular user considers to qualify as dark). In other words, the light falling on a photo-sensor is certain; it is a fact. In contrast, the notion that it is dark in a room or outside is uncertain; it is a belief, and one user may believe it is dark when another does not.

Social context is another example of context having a range of concepts that can be assessed with varying levels of ease. On one end of the spectrum, it is relatively easy to determine the number of people in a room and even who is in a room. It is more difficult to determine how two people are interacting in a social, work, or personal situation.

Within each of the physical and social realms, as well as intentional, mental, temporal, and preferential realms (among others), some contexts are discernable to some relatively higher degree of certainty, while others are discernable to a relatively lower degree of certainty. It is relatively easy to discern with some certainty a user's intentional context based on items in their to-do list or on their calendar. However, it is more difficult to discern with any certainty a user's intentions based on interpreting their emotions. Over time, knowledge of how to increase the certainty of such contexts will increase. The herein described context platform of computing system 10 provides an extensible framework for taking advantage of contextual knowledge in a virtually endless number of applications.

Context store 12 of FIG. 1 is configured to hold one or more context items 30, such as Context Item A, Context Item B, Context Item C, Context Item D, through Context Item n. It is to be understood that the context store can hold virtually any number of context items. Each context item may correspond to a physical phenomenon, logical condition, a relation, or other piece of information that can be processed to make contextual decisions.

The context store is the heart of the context platform. It is the one place that all context items may be instantiated, accessed, and/or updated. The context store serves as a central repository for all context items of the computing system. In some embodiments, the context store is configured to hold only state information, and is not intended to include a logic engine for processing information from the context store. Instead, domain interpreters 14 are configured to apply logic for altering context items in the context store and/or making other contextual decisions. Keeping state information separate from logical operations favors the extensibility of the context store, as a variety of different context items can be held by the same context store, even if such items correspond to diverse contextual concepts. As described in more detail below, standardization of the context store allows domain interpreters to instantiate, access, and/or update context items in a universally compatible manner, thus simplifying development of such domain interpreters. In other embodiments, domain interpreters may be included as part of the context store.

The context store may include a database, which may be comprised of computer-readable media (i.e., memory) holding or storing a structured collection of data (e.g., context items). In some embodiments, a computing system will use a locally located context store. In other embodiments, a computing system will use a remotely located context store, which, for example, may be accessed via a network. In still other embodiments, the context store may be physically located in two or more different locations (e.g., a distributed database), though presenting itself as a single storage location to the computing system.

The context store can be configured to suspend execution in the time between alterations to context items of the context store. In other words, because the context store may be implemented as a database that includes only state information, the context store need not concern itself with the logical operations that are instead performed by the domain interpreters. As such, the context store can be configured to not consume any processing cycles when suspended, thus decreasing energy requirements.

Figure 2:
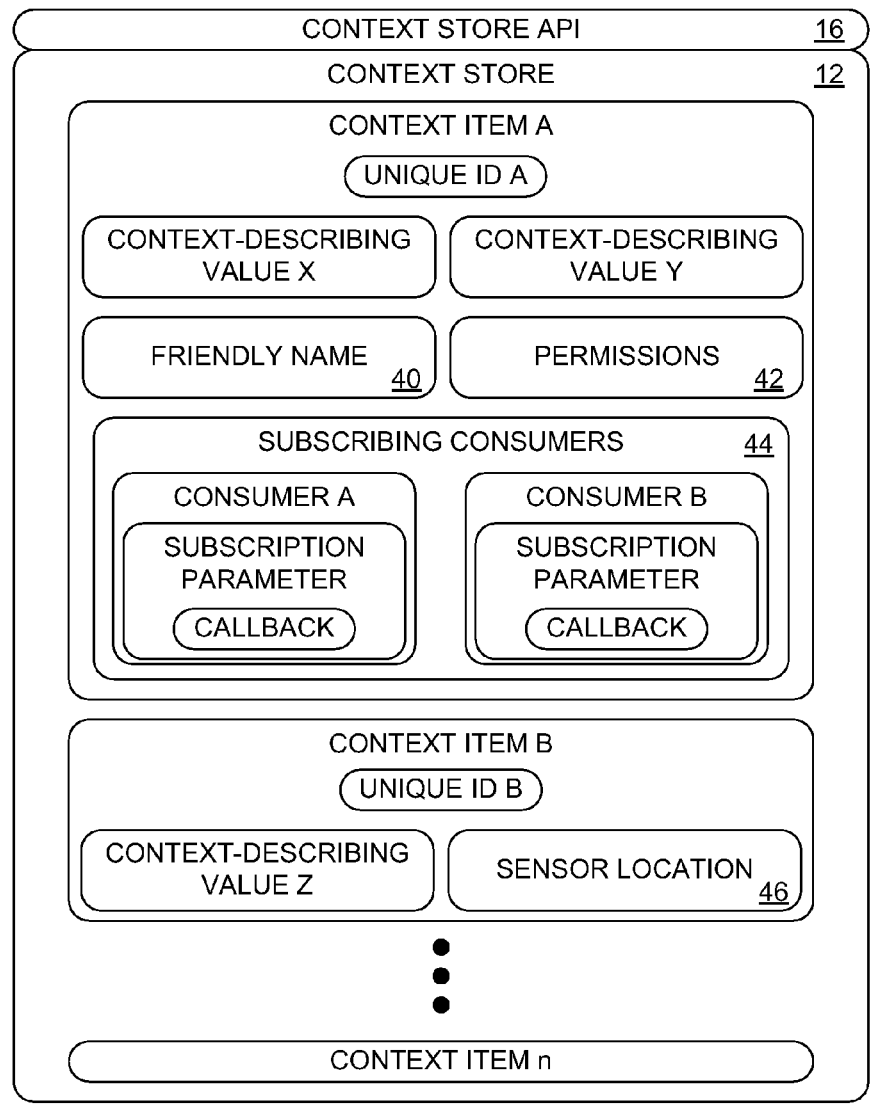
FIG. 2 shows a context store of the computing system of FIG. 1.

FIG. 2 schematically shows a more detailed view of context store 12. As shown by example with Context Item A and Context Item B, each context item includes a unique identifier (e.g., Unique ID A and Unique ID B) and one or more context-describing values (e.g., Context-Describing Value X, Context-Describing Value Y, and Context-Describing Value Z). Each context item may additionally or alternatively include a specification of how that context item is related to another context item. The unique identifier distinguishes a context item from all other context items.

In some embodiments, the Unique ID may be comprised of a composite ID including two or more different subparts. As a nonlimiting example, a Unique ID may include a user-id subpart, a context-id subpart, and a location-id subpart. In such a formulation, the context-id subpart may refer to a particular chain of coffee shops, for example, and all coffee shops in the chain may share the same context-id subpart. However, the location-id subpart may refer to a particular instance of the coffee shops (e.g., the coffee shop at a particular physical address). In this way, coffee shops at two different physical addresses will be associated with different location-id subparts. Such a formulation is provided as an example, and Unique IDs having different subpart classifications are within the scope of this disclosure.

Each context item may be referred to by a unique ID, which may optionally be comprised of two or more subparts, and each context item may use one or more context-describing values to describe a context with which that context item is concerned and/or a relationship that context item may have with other context items. As a nonlimiting example, a current GPS position could be referred to as <GPS_position, [latitude, longitude]>. That context item may be a well-known public context description that is published by a context platform developer or a third party. That context may alternatively be a private context that is not published. In the above example, a party might want to refer to a different GPS position with more precision, such as <GPS_position_plus, [latitude, longitude, altitude, heading]>. As such, a new context item with a different unique identifier can be instantiated in the context store. Either context item is valid, and an application with suitable permissions can access one or both context items provided the application is made aware of the proper unique identifiers (e.g., GPS_position and/or GPS_position_plus).

In some embodiments, a context item may include an archival log of previous context-describing values. As a nonlimiting example, the context item may include a history of time-stamped values for one or more context-describing values, thus allowing a domain interpreter to analyze potential trends that can be used to more accurately assess a particular context.

As shown in FIG. 2, a context item may include additional information. As a nonlimiting example, Context Item A also includes a Friendly Name 40 providing a human-readable alias to the unique identifier; Permissions 42 defining the computing systems, users, or processes that have permission to access the context item; and a Subscribing-Consumers Listing 44 of context consumers subscribing to the context item.

In some embodiments, a context item may include a specification of how that context item is related to other context items. For example, a context item may exist for a particular coffee shop at a particular physical address. Such a coffee shop is a "kind-of" restaurant, which in turn is a "kind-of" business establishment, and so on up the chain of relations to a root "place." Such "kind-of" relations may be specified as part of a context item. Relations other than "kind-of" relations may additionally or alternatively be specified as part of a context item. In some embodiments, relations may themselves form a context and may be defined as other contexts are defined in the context store.

The organization of objects, attributes, and/or values, and the relations between such objects, may be referred to as an ontology. As an example, a portion of such an ontology may include a "place," which among other items, may include one or more "countries," each of which may include, among other items, one or more "cities," each of which may include, among other items, one or more business establishments, and such ontology can be further refined until a particular coffee shop at a particular physical address, for example, is included in the ontology. The above is provided as a nonlimiting example, and virtually any hierarchy can be established.

The relations set forth in an ontology may be specified in a relational manner with each particular context in the context store including a specification of the items that are above, below, or an the same level as that item in the hierarchy. The context store provides for the definition of an ontology, but can be used without such an ontology.

In some embodiments, a context item may include executable code for execution by the context store itself, or which may be passed to a context consumer or a context provider for execution.

A context item may include data that a user wishes to keep secret from one or more computing systems, users, or processes (e.g., a user may wish to keep his current location secret from all but a single trusted domain interpreter). Accordingly, Permissions 42 may optionally be associated with one or more context items, such Permissions including permissions data used to track which computing systems, users, or processes have been granted permission to access the context item. Such Permissions may be granted in varying degrees (e.g., read only, read/write, etc.). Getting or setting context-describing values for the context item can be forbidden to any computing system, user, or process not having permission to access the context item.

Subscribing-Consumers Listing 44 may be used to track which domain interpreters are interested in a particular context item. This allows, for example, such domain interpreters to be notified if changes are made to the context item. For each context consumer subscribing to a context item, the Consumer-Subscription Listing may include one or more subscription parameters indicating which alterations to context-describing values are to trigger a callback method. Furthermore, the Consumer-Subscription Listing may include, for each such subscription parameter, identification of the callback method to be triggered. In this way, a domain interpreter may register a callback method with the context item, thus allowing the context store to notify interested domain interpreters when changes are made.

As shown by example with Context Item B of FIG. 2, a context item representing a sensor may also include a Sensor Location 46. The Sensor Location may include an indication of a physical location of a sensor that has been used to supply the context item with information. For example, the Sensor Location may include an indication of a physical location of the sensor (or other context provider) that last updated a context-describing value of the context item. The Sensor Location can be used to discern information that may be relative to the context. As a nonlimiting example, the Sensor Location may include an indication allowing a domain interpreter to differentiate between a smoke detector in a bedroom and a smoke detector in a basement.

The above described parameters are nonlimiting examples of items that can be associated with and held as part of a context item. Nonlimiting examples of other information that may be held as part of a context item includes aging policy, persistence, depth, arbitration, and certainty. As another example, a context item may also include an inference source and possible definition (e.g., an indication of a method that a domain interpreter uses to establish the values and/or certainty factor for a particular context-describing value). It will be understood that a variety of different data can be included with a particular context item. A characteristic of the context store is the extensibility that permits a domain interpreter to define a new context that is represented differently from any others presently defined, while at the same time being able to take advantage of the same context items used by other domain interpreters.

FIG. 1 shows a plurality of domain interpreters 14 in operative communication with context store 12. Each domain interpreter may include one or more of a context provider 50 and a context consumer 60. In other words, some domain interpreters may include one or more context providers but no context consumers; some domain interpreters may include one or more context consumers but no context providers; and some domain interpreters may include both of one or more context providers and one or more context consumers.

Each context item held in the context store can be accessed, updated, or otherwise altered by one or more domain interpreters, as described in more detail below. Publishing definitions for context items allows domain interpreters to more easily share information amongst each other.

Each context provider of a domain interpreter, such as context provider 50 of FIG. 1, may be configured to output a context-describing value that can be held as part of a context item of the context store. In other words, a context provider can be used to feed information to a context item of the context store.

As illustrated, context provider 50 may include one or more sensors, such as sensor 52. Context providers may include virtually anything that can establish and maintain context items in the context store. As described in more detail below, sensors are a type of context provider that maintains information about the physical world in the context store. However, context providers other than sensors may also be used. A context provider may include a logic module configured to assign to a corresponding context-describing value of the context store a value derived from a logical operation. As an example, a logical provider may include an application that queries the state of another application, such as whether an e-mail is being read, and instantiates that state information in the context store.

Context providers may determine context from a wide variety of different sources, nonlimiting examples of which include:

- Sensors (e.g., position, light, acceleration, humidity, temperature, traffic, etc.);
- Devices (e.g., the number and/or types of devices connected to a computing system);
- Connections (e.g., the types of available network access);
- Software (e.g., the applications being used, and the states of such applications);
- Data (e.g., information from calendar, to-do lists, preferences, contact lists, personal info, etc.);
- Services (e.g., network services providing location by IP, traffic information, weather, news, etc.);
- Declarative and interrogative (e.g., proactive instructions and instructions provided in response to a question or other request for input);
- Inferences (e.g., algorithms, heuristics, predicate logic, fuzzy logic, neural networks, expert systems, Bayesian networks, etc.)
- Relations (e.g. the relations between contexts, such as resides-in, contains, has-a, is-a, kind-of, etc.)

A context platform may be extensibly configured for compatibility with context providers that assess context using any one or more of the above listed techniques, as well as virtually any other suitable technique. While any one of the above techniques may be independently useful, additional value may be achieved when two or more context assessing techniques are considered collectively. As an example, a GPS sensor alone may be interesting, providing a coordinate location of a user. However, with the addition of information about the user's compass orientation and the direction that his eyes are looking, it may be possible to identify objects that are within the user's field of view. Those objects can then become a part of the collection of context items for the person or the place in which the person resides.

When present in a domain interpreter, a context provider may include a sensor configured to measure a quantifiable phenomenon of the physical world and assign to a corresponding context-describing value of the context store a quantified value of the phenomenon as measured.

Sensor devices are a particular case of context provider. Generally speaking, sensors may alter context, but generally do not respond to changes in context. Although changes in context may alter the ways in which a sensor analyzes or reports sensor data.

Sensor devices may interface with the context platform through a standard mechanism for discovering and connecting sensor class devices and for describing data from common types of sensors in a uniform but extendable manner. This mechanism works with either external or internal sensors. Furthermore, this mechanism does not force compliance with a particular bus standard.

External sensors can interface with the context platform through a sensor class driver by using a data description schema. In some embodiments, a sensor may use a custom driver that can accommodate different transports or additional processing corresponding to that sensor. The sensor platform may optionally calibrate and filter sensor data in addition to logging raw data.

Some sensors may include logical sources of data. In some embodiments, it is possible to use sensors or other devices that have no knowledge of the context platform. Rather than making those devices conform to a new driver standard, the context platform can offer proxy drivers that access device data and convert it into a form that is suitable for the context platform. This capability may enable device manufacturers to retrofit devices that produce nonstandard outputs.

Sensors can be classified by a location and a relationship relative to a user. As an example, sensors may include onboard sensors embedded within the enclosure of a computing system such as a mobile computer, a tablet computer, or the like. Such sensors may sense the environment relative to that enclosure. The sensed information may be related to conditions within the enclosure, such as temperature, fan speeds, and g-forces. The sensed information may also be related to conditions outside the enclosure. For example, a brightness sensor can be located at least partially inside the enclosure of a mobile computer, and such brightness sensor may detect ambient light levels outside the enclosure.

Sensors may include on-person sensors carried on or near the body of a person. Such sensors may sense the environment relative to that person. In other words, such sensors may effectively share with the context platform one or more of a person's five natural senses (i.e., sight, sound, smell, touch, taste). Such sensors often can provide improved and/or more accurate sense data than is naturally available to a user, and such sense data can be utilized by the context platform. In addition, sensors can be used to augment a person's senses, such as by providing the ability to sense compass orientation or the proximity to unseen objects and obstacles.

Sensors may include nearby sensors that can sense the physical world within a space relative to the sensors (e.g., same room or some nearby area). For example, such sensors can sense objects or sounds in a room and people moving about the space. Extending this concept to nearby space under a user's control, this class of sensors can sense a baby crying in an upstairs bedroom or motion occurring in any room in a house.

Sensors may include remote sensors that are not within the immediate vicinity of a user. Such sensors may sense private or public information that is important to a user. Private remote sensors include home automation sensors, which may be located at one or more locations of interest. Public remote sensors include traffic cameras, weather sensors, and other information that is often presented as a web service.

Each context consumer of a domain interpreter, such as context consumer 60 of FIG. 1, may be configured to input a context-describing value from a context item held in the context store and/or establish relations between those contexts. In other words, a context consumer can be used to retrieve information from a context item of the context store. Context consumers may include virtually any user-mode component that can query context items in the context store or subscribe to changes in context items in the context store. For example, a context consumer may subscribe to a context event that the context store fires when the context "at home" is fired in response to the user walking in the front door of her home.

In some embodiments, a consumer may subscribe to a collection of context items. For example, a 'DEVICES' collection could be defined, and a consumer could subscribe to the 'DEVICES' collection. In such a scenario, any device that comes into the system would register as a device, and subscribed consumers could be passed a message notifying the subscribed consumers of the device. This can be extended to include subscribing to any kind of collection, including, for example, the collection of every context in the system. In this way, consumers could remain aware of entrance to or exit from the system of any contexts in which they are interested. Effectors, such as effector 62 of FIG. 1, are a nonlimiting example type of context consumer. An effector device may be configured to alter a quantifiable phenomenon of the physical world in accordance with a context-describing value held in the context store. In other words, effectors are devices that can make changes in the physical world (e.g., closing a door, ringing a bell, opening a water valve, changing the brightness of a display, etc.). This is different than making changes in the logical world of a computer, which usually involves making changes in the state of software. While effectors are a type of context consumer, context consumers can include nonphysical logic modules configured to use information from the context store to perform one or more logical operations. Such logical operations can alter one or more values of the context store and/or such logical operations can be used to effectuate some action outside of the context store (e.g., change the state of an application).

The ability to sense the physical environment becomes particularly useful when combined with the ability to make changes in that environment. For example, being able to remotely sense that a garage door has been left open becomes very useful when coupled with the ability to remotely close the garage door. As such, context consumers may include logic modules and/or effectors that enhance the capabilities of the context platform.

Effector devices can be conceptualized as virtual mirror images of sensor devices. One consequence of such mirror-imaging is that sensor devices can be configured to have direct access to effector devices, as is schematically illustrated by arrow 70 of FIG. 1. While arrow 70 shows direct access between a context provider and a context consumer of the same domain interpreter, it should be understood that direct access may be established between a context provider of a different domain interpreter than a context consumer.

A domain-specific rules engine can be configured to allow an effector device to input data directly from a sensor device. In this way, developers can create real-time, high-bandwidth, control loops when desired. As a nonlimiting example, an accelerometer that senses acceleration of a laptop can send acceleration information directly to a hard drive so that the hard drive may park its heads in the event the laptop is dropped. Because it is advantageous to perform this action quickly, the direct communication between the sensor and the effector may be beneficial. Such direct communication may be established between other types of context providers and context consumers.

A sensor device with direct access to an effector device may allow a computing system to remain in a low power (e.g., sleep) state without interfering with the synergy between the sensor (or other context provider) and the effector (or other context consumer). If the only processing capability in the system is in the operating system, the operating system would need to be active to handle simple asynchronous processing tasks, such as ringing a bell when the doorbell is pressed. Smart sensor and effector devices can process such simple "reflex" events without needing to wake the operating system, which can greatly reduce average power requirements. The state or value of that direct 'reflex' connection may be instantiated in the context store as the value of a context item when the store awakens.

As shown in FIG. 1, computing system 10 may include a context store API 16. The context store API can be used to provide a domain interpreter access to context items in the context store. To this end, the context store API may enable a plurality of methods for interacting with the context store. Such methods may use the unique identifier of a context item as a parameter for accessing that context item.

Context providers can instantiate new context items in the store and/or all expected contexts may be instantiated without values, allowing context providers to supply values at a later time. Relations also may be predefined at startup and/or instantiated by providers at runtime.

A compatibility convention of a context item, including its unique identifier, may be published or otherwise made known to developers. As such, developers can design domain interpreters that access the context items of the context store using the unique identifier as a parameter, even though such domain interpreters may not initially have any knowledge of what other domain interpreters have worked with the context items. The context store API allows a single context item to be altered by different domain interpreters. This kind of system—a central store with a plethora of co-operating domain-specific "experts," each contributing their domain knowledge or reasoning ability to the store—is sometimes called a blackboard system.

In some embodiments, the context store API may provide a context consumer direct access to data from a context provider without first holding data in the context store. Such a direct exchange can be used to decrease latency and/or improve energy consumption, as described above.

In some embodiments, the context store API may be described with pseudo-code having the form of method( CID, values ), where CID is the unique identifier of a context item and values are context-describing values or other information associated with the context item. The following are example methods that may be included in a context store API.

New( CID ); Add( CID, values ); Remove( CID ); Delete( CID ); Clone( CID, CID');
    Get( CID, values); Set( CID, values); Update( CID, values );
    Subscribe( CID, callback, ID); Unsubscribe( CID, ID )
    Relate(CID1, CID2, relation); Unrelate(CID1, CID2, relation ).

Also contemplated are methods for registering rules, enumerating unique identifiers, values, or attributes, finding relations, collecting related contexts, and searching friendly names, among others.

Figure 3:
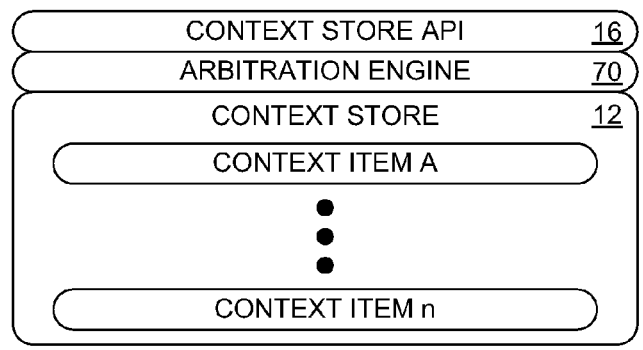
FIG. 3 shows an arbitration engine that can be used with a context platform.

As shown in FIG. 3, a context store, or other aspect of a context platform, may include an arbitration engine 70 configured to resolve conflicting requests to change a context-describing value of a context item held in the context store. The arbitration engine may arbitrate changes to context items by using an algorithm (e.g., a domain-specific arbitration algorithm associated with a context item, a default arbitration algorithm associated with two or more different context items, a custom algorithm associated with one or more particular context providers, etc.). Possible arbitration mechanisms include prioritization, voting, most certain wins, least salient loses, and persistence of the most recent, to name a few.

Figure 4:
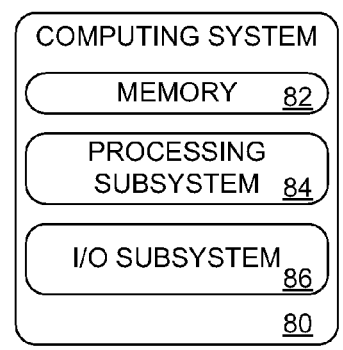
FIG. 4 schematically shows a computing system for implementing a context platform in accordance with an embodiment of the present disclosure.

Computing systems for implementing the herein described context platform may be variously configured while remaining within the scope of this disclosure. As discussed above, various aspects of such computing systems, including the context store and domain interpreters, may include hardware and software components. The domain interpreters may include peripheral devices, sensors, and/or independent computing devices. FIG. 4 schematically shows one example computing system 80 that can be used to implement a context platform. Computing system 80 includes a memory 82, a logic subsystem 84, and an I/O subsystem 86. It should be understood that computing system 80 may include several components, subsystems, and software modules not shown.

Logic subsystem 84 may be configured to execute one or more instructions. For example, the logic subsystem may be configured to execute one or more instructions that are part of one or more programs, routines, objects, components, data structures, or other logical constructs. Such instructions may be implemented to perform a task, implement an abstract data type, or otherwise arrive at a desired result. In particular, such instructions may provide the context store, context store API, and/or domain interpreter functionality described above. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 82 may be a device configured to hold instructions that, when executed by the logic subsystem, cause the logic subsystem to implement the herein described methods and processes. Memory 82 may include volatile portions and/or nonvolatile portions. In some embodiments, memory 82 may include two or more different devices that may cooperate with one another to hold instructions for execution by the logic subsystem. In some embodiments, logic subsystem 84 and memory 82 may be integrated into one or more common devices and/or computing systems.

I/O subsystem 86 may be configured to communicatively couple computing system 80 with one or more sensors, effectors, peripheral devices, networked computing devices, or other distinct entities. Such communication may be established using virtually any communication technology (e.g., USB, IEEE 1394, IEEE 802.3, IEEE 802.11x, IEEE 802.15, etc.).

FIG. 5 shows a process flow of a method 90 of providing a plurality of domain interpreters universal access to a common context store. At 92, method 90 includes publishing a compatibility-convention for defining one or more contextual concepts as context items. Such a compatibility convention may that each context item includes at least a unique identifier and one or more context-describing values. At 94, method 90 includes holding one or more context items in a common context store. Each context item can be held in accordance with the compatibility-convention published for that context item. At 96, method 90 includes granting provider access to one or more domain interpreters including a context provider configured to set a context-describing value of a context item in the context store. In some embodiments, provider access is granted to one or more domain interpreters via an application programming interface. At 98, method 90 includes granting consumer access to one or more domain interpreters including a context consumer configured to get a context-describing value of a context item from the context store.

It will be appreciated that the embodiments described herein may be implemented, for example, via computer-executable instructions or code, such as programs, stored on computer-readable storage media and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer," "computing device," "computing system," and the like include any device that electronically executes one or more programs, including two or more such devices acting in concert.

A domain translator can reside on the same machine(s) as the context store and/or a domain translator may be remote from the context store. Domain translators may include domain specific processing elements (e.g., hardware, software, and/or firmware) and can be local or remote.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
   a memory holding instructions that, when executed by a logic subsystem, instantiate an extensible context store and one or more domain interpreters and enable an application programming interface;
   the extensible context store holding one or more context items, each context item including a unique identifier and one or more context-describing values;
   the one or more domain interpreters in operative communication with the extensible context store, each domain interpreter including one or more of a context provider and a context consumer,
   each context provider configured to output a context-describing value for holding in a context item of the extensible context store,
   each context consumer configured to input a context-describing value from a context item held in the extensible context store; and
   the application programming interface providing the one or more domain interpreters access to context items in the extensible context store, the application programming interface using the unique identifier of each context item as a parameter for accessing that context item, the application programming interface permitting a domain interpreter to extensibly define a new context item that is represented differently from any other context items held by the extensible context store, and the application programming interface allowing a single context item to be altered by different domain interpreters.

2. The computing system of claim 1, where a context item further includes permissions defining computing systems, users, or processes that have permission to access the context item, and where getting or setting context-describing values for the context item is forbidden to any computing system, user, or process not having permission to access the context item.

3. The computing system of claim 1, where a context item further includes a listing of context consumers subscribing to the context item.

4. The computing system of claim 3, where a context item further includes, for each context consumer subscribing to the context item, subscription parameters indicating which alterations to context-describing values are to trigger a callback method.

5. The computing system of claim 4, where a context item further includes, for each subscription parameter, identification of the callback method to be triggered.

6. The computing system of claim 1, where a context item further includes a specification of how that context item is related to another context item.

7. The computing system of claim 1, where a context item further includes a friendly name providing a human-readable alias to the unique identifier.

8. The computing system of claim 1, where a context item further includes an indication of a physical location of a sensor of the context provider that last updated a context-describing value of the context item.

9. The computing system of claim 1, where the context item includes an archival log of previous context-describing values.

10. The computing system of claim 1, where the extensible context store is configured to hold only state information and the domain interpreters are configured to apply logic for altering context items in the extensible context store.

11. The computing system of claim 1, where, when present, the context provider includes a sensor configured to measure a quantifiable phenomenon of a physical world and assign to a corresponding context-describing value of the extensible context store a quantified value of the phenomenon as measured.

12. The computing system of claim 1, where, when present, the context provider includes a logic module configured to assign to a corresponding context-describing value of the extensible context store a value derived from a logical operation.

13. The computing system of claim 1, where, when present, the context consumer includes an effector device configured to alter a quantifiable phenomenon of a physical world in accordance with a context-describing value held in the extensible context store.

14. The computing system of claim 1, where the extensible context store is configured to suspend execution between alterations to context items of the extensible context store.

15. The computing system of claim 14, where the extensible context store is configured to not consume any processing cycles when suspended.

16. The computing system of claim 1, where the application programming interface further provides a context consumer direct access to data from a context provider without first holding data in the extensible context store.

17. The computing system of claim 1, further comprising an arbitration engine configured to resolve conflicting requests to change a context-describing value of a context item held in the extensible context store.

18. A method of providing a plurality of domain interpreters universal access to a common context store, the method comprising:

publishing a compatibility-convention for defining one or more contextual concepts as context items, the compatibility-convention specifying that each context item includes at least a unique identifier and one or more context-describing values;

holding one or more context items in a common context store, each context item held in accordance with the compatibility-convention published for that context item;

granting provider access via an application programming interface to one or more domain interpreters including a context provider configured to set a context-describing value of a context item in the context store;

granting consumer access via the application programming interface to one or more domain interpreters including a context consumer configured to get a context-describing value of a context item from the context store; and granting definition authority via the application programming interface to one or more domain interpreters, said definition authority permitting a domain interpreter to extensibly define a new context item that is represented differently from any other context items held by the context store.

19. Computer-readable memory including instructions that, when executed by a processing subsystem, provide a plurality of domain interpreters universal access to a common context store by performing a method comprising:

holding one or more context items in a common context store, each context item held in accordance with a compatibility-convention published for that context item, the compatibility-convention specifying that each context item includes at least a unique identifier and one or more context-describing values;

granting provider access via an application programming interface to one or more domain interpreters including a context provider configured to set a context-describing value of a context item in the context store at least in part by identifying the context item by the unique identifier for the context item;

granting consumer access via the application programming interface to one or more domain interpreters including a context consumer configured to get a context-describing value of a context item from the context store at least in part by identifying the context item by the unique identifier for the context item;

granting definition authority via the application programming interface to one or more domain interpreters, said definition authority permitting a domain interpreter to extensibly define a new context item that is represented differently from any other context items held by the context store.

* * * * *